United States Patent [19]
Roseman et al.

[11] Patent Number: 5,663,632
[45] Date of Patent: Sep. 2, 1997

[54] FIELD CURRENT CONTROL FOR GENERATOR DURING BUILD-UP

[75] Inventors: Ronald W. Roseman, Walton Hills; Kevin E. Rice, Stow, both of Ohio

[73] Assignee: Lucas Aerospace Power Equipment Corp., Aurora, Ohio

[21] Appl. No.: 503,383

[22] Filed: Jul. 17, 1995

[51] Int. Cl.$^6$ .................................................. H02P 9/10
[52] U.S. Cl. .................................. 322/59; 322/28; 322/29
[58] Field of Search .......................... 322/20, 60; 307/19, 307/87; 290/4 R

[56] References Cited

U.S. PATENT DOCUMENTS

| | | | |
|---|---|---|---|
| 3,809,996 | 5/1974 | Meisenheimer | 322/28 |
| 4,164,661 | 8/1979 | Hucker et al. | 307/57 |
| 4,335,344 | 6/1982 | Gant | 322/25 |
| 4,496,897 | 1/1985 | Unnewehr et al. | 322/25 |
| 4,701,690 | 10/1987 | Fernandez et al. | 322/28 |
| 4,728,806 | 3/1988 | Baker et al. | 307/43 |
| 4,967,096 | 10/1990 | Diemer et al. | 307/19 |
| 5,051,670 | 9/1991 | De Piola | 318/434 |
| 5,168,208 | 12/1992 | Schultz et al. | 322/25 |
| 5,495,162 | 2/1996 | Rozman et al. | 322/10 |

FOREIGN PATENT DOCUMENTS

| | | |
|---|---|---|
| 1601197 | 10/1981 | United Kingdom. |
| 2145545 | 3/1985 | United Kingdom. |
| 2172416 | 9/1986 | United Kingdom. |

*Primary Examiner*—Steven L. Stephan
*Assistant Examiner*—Nicholas Ponomarenko
*Attorney, Agent, or Firm*—Rankin, Hill, Lewis & Clark

[57] ABSTRACT

Apparatus and method for connecting a generator to an energized bus includes a circuit for determining voltage differential between the generator voltage and the bus voltage; a circuit for connecting the generator to the bus when the voltage differential reaches a predetermined threshold; a circuit for limiting the generator field current during build-up so that the generator reaches a predetermined speed before the generator is connected to the bus.

17 Claims, 2 Drawing Sheets

FIELD CURRENT CONTROL FOR GENERATOR DURING BUILD-UP

BACKGROUND OF THE INVENTION

The invention relates generally to methods and apparatus for controlling generators such as are often used on engines. More particularly, the invention relates to generator control for connecting the generator to an energized bus.

Generators are commonly used as starters and electrical power plants on engines such as aircraft gas turbine engines, for example. In some applications, multiple generators are used for supplying electrical energy to a load. As a starter/generator for an engine, the generator armature is supplied electrical energy typically from a starter battery. The generator develops substantial torque initially to begin turning the engine. In a typical DC shunt generator, the armature current also is used to supply the field excitation current.

Eventually, the starter/generator and engine reach a sufficient speed for full engine start to begin. At such time, the battery is disconnected from the generator and the generator is thereafter connected to a main bus or load, typically through closure of a contactor switching mechanism sometimes referred to as a line contactor. After connection to the bus, the generator functions as a power source driven by the running engine. This switching from a starter to a generator is commonly referred to as starter cutoff. In addition to wanting adequate engine speed at starter cutoff, adequate generator speed is also needed to permit proper voltage regulation of the generator output, as well as to assure that the generator can accommodate the expected load after it is connected to the main bus.

After starter cutoff, the generator continues to increase in speed driven by the engine. Depending on the particular generator and expected load conditions, a typical starter cutoff speed may be about 5500 rpm while the full load generator speed may be 8000 rpm, for example. Closure of the line contactor to connect the generator to a bus can be controlled, for example, by the use of a generator speed sensor, or by comparing the generator open circuit voltage with the bus voltage. In the latter case, the line contactor may be closed when the generator output voltage reaches a predetermined threshold close to the bus voltage.

In cases where the bus is energized by a second generator, a paralleling function or load balancing may be included in a system operation.

However, systems that include such paralleling functions tend to exhibit transient disturbances when a generator is connected to an energized bus. For example, assume a first generator is already connected to a bus and thus energizing the bus. If a second generator is connected to the energized bus before the second generator reaches sufficient speed for regulation or load capacity, the paralleling function will tend to drop the output voltage of the first generator, at a time when that first generator is really the only one of the two at sufficient speed to handle the load and regulation. The slow speed generator may also experience undesirable reverse currents, which currents may cause a reverse current trip to disconnect the generator from the bus. As soon as this happens the generator output voltage will rise again to the threshold needed for connection to the bus and the line contactor will again close. This undesirable line contactor cycling may go on during the spin-up and produce considerable system disturbance.

Although a generator speed sensor can be used as a control function for determining when to close the line contactor, such sensors tend to be expensive high maintenance items. Furthermore, if a speed sensor becomes inoperative or its output is otherwise lost as an input to the generator control circuit, the entire start-up operation may be unnecessarily aborted.

The objectives exist therefore for a method and apparatus for controlling connection of a generator to an energized bus such that the generator speed is adequate for regulation and load sharing, independent of the need for a generator speed sensor.

SUMMARY OF THE INVENTION

To the accomplishment of the foregoing objectives, the invention contemplates, in one embodiment, apparatus for controlling connection of a generator to an energized bus, comprising means for determining voltage differential between the generator voltage and the bus voltage; means for connecting the generator to the bus when said voltage differential reaches a predetermined threshold; and means for limiting the generator field current during build-up so that the generator reaches a predetermined speed before the generator is connected to the bus.

The invention further contemplates the methods embodied in the use of such apparatus, as well as in another embodiment a method for controlling connection of a generator to an energized bus without the use of a generator speed signal, comprising the steps of:

a. using a voltage differential between the generator voltage and the bus voltage as a control parameter for connecting the generator; and b. limiting generator field current during generator build-up to delay connecting the generator to the bus until the generator reaches a predetermined speed.

These and other aspects and advantages of the present invention will be readily understood and appreciated by those skilled in the art from the following detailed description of the invention with the best mode contemplated for practicing the invention in view of the accompanying drawings.

DETAILED DESCRIPTION OF THE INVENTION

Figure 1:
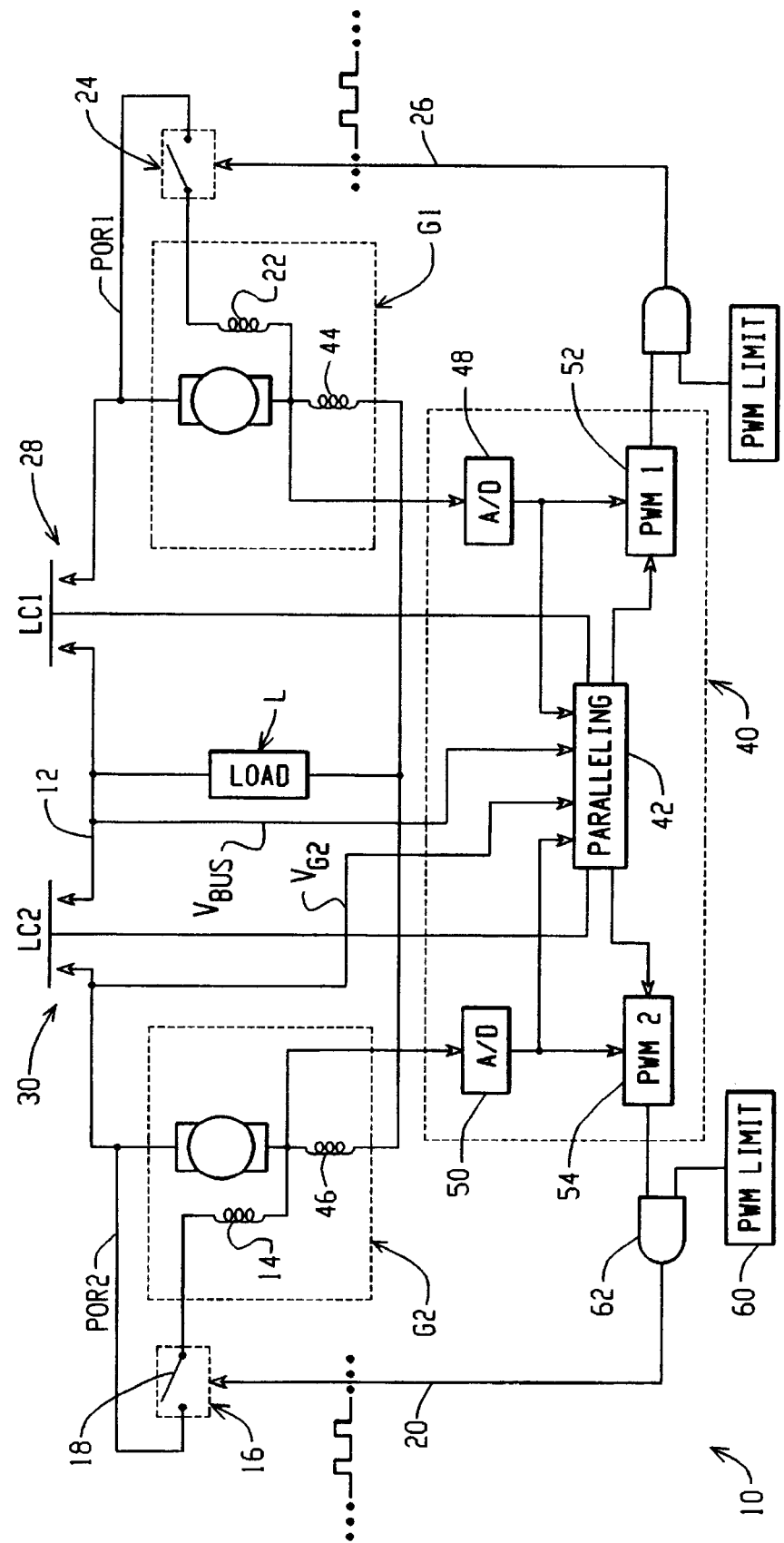
FIG. 1 is an electrical schematic of a typical two generator system suitable for use with the present invention.

With reference to FIG. 1, a dual generator system is generally designated with the reference numeral 10. Although the invention is described herein with particular reference to DC shunt generators of the type such as can be used conveniently as a starter/generator for an aircraft engine, this is for purposes of explanation and should not be construed in a limiting sense. Those skilled in the art will readily appreciate that the teachings of the present invention can be applied in AC generators, for example. Thus, rather than being application specific, the invention is more broadly construed as being directed to monitoring and control apparatus and methods for connecting such generators to an energized bus during build-up. Those skilled in the art will also appreciate that the invention is not limited to the exemplary embodiments described herein, including but not limited to the description of the use of two generators.

As used herein, the term "starter/generator" simply refers to the fact that a generator such as described herein can be used as a starter for an engine, and after engine start can be used as a power plant for the aircraft. However, reference to the use of the invention with such a starter/generator is not intended to be limited only to generators used as starters.

It is noted at this time that the generators G1 and G2 are not shown in detail in the drawings because the particular generator design forms no critical part of the present invention. In the described embodiment, each generator is a DC shunt generator such as generator 23080-013 available from Lucas Aerospace Power Equipment Corporation. However, the invention can also be used conveniently with series and compound generators, for example.

As illustrated in FIG. 1, the invention can be practiced with a typical arrangement in which a number of generators (in this exemplary description, two) G1 and G2 are to be connected to a common load L via a bus 12. Additional generators can be used if so desired.

Generally, a generator "G" has field windings 14 disposed on a stator assembly and armature windings disposed on an armature rotor. In a generator, when used as a starter, a power source such as a battery typically is connected to the armature through a start bus and contactor (not shown). In shunt type generators such as described in the exemplary embodiment herein, the field is supplied by armature current through a field drive switching device 16. In this case, the field current is controlled by pulse width modulation (PWM) of the duty cycle of a field drive FET transistor 18 gate drive signal 20.

In a similar manner, the other generator G1 is illustrated in a shunt configuration and includes a field winding 22, and a field drive control switching device 24 using a PWM drive signal 26. A line contactor 28, 30 is provided respectively to connect each generator G1, G2 to the bus 12. The line contactors 28, 30 may be conventional in design and are well known in the art.

A control circuit 40 is typically provided with or coupled to the generators for performing various monitoring and control functions. The control circuit can be, for example, a microprocessor-based controller such as shown and described in co-pending U.S. patent application Ser. No. 08/131,196 filed on Oct. 1, 1993 for MICROPROCESSOR CONTROLLER FOR STARTER-GENERATOR, owned in common by the assignee of the present invention, the entire disclosure of which is fully incorporated herein by reference. Those skilled in the art will understand, however, that the invention can be used with many different types of control circuits and algorithms. In some applications, the control circuit 40 can be realized with discrete circuitry of conventional design without the need for a microprocessor or similar controller. For purposes of the present invention, the basic functions carried out by the control circuit are: 1) regulate the generator output voltages (generally noted as the point of regulation "POR1" and "POR2"); 2) control operation of the line contactors 28, 30; and 3) control the generators' respective field currents in response to the output voltage regulation requirements, as well as in response to the speed of the generators and the load the generators are connected to. This is not intended to be an exhaustive nor required list of control functions performed by the circuit 40, and those skilled in the art will readily appreciate that a typical control circuit 40 for a starter/generator can include additional or fewer monitoring and control functions such as temperature compensation, starter torque limiting, fault detection and so forth.

Control of the line contactors LC1 and LC2 can be effected in any convenient manner well known to those skilled in the art. In the exemplary embodiment of FIG. 1, the line contactors are controlled by the control circuit 40 which monitors the open circuit generator voltage $V_{G2}$ and compares it to the energized bus voltage $V_{BUS}$. For clarity and ease of understanding, the details of this control function in the control circuit 40 is not shown in FIG. 1 because it can be conventional in design such as a straightforward comparator function, or alternatively as part of the paralleling circuit (as shown in FIG. 1), for example. The important point with respect to the present invention is that preferably the line contactors are closed based on the generator output voltage building or increasing to within a selected ranger 78 or threshold 72 (see FIG. 2) of the energized bus.

The third function noted above relating to field current control in response to voltage regulation, speed and load, may include a paralleling or load sharing function well known to those skilled in the art. A typical paralleling function operates to try to balance the load sharing between the generators G1 and G2. For example, if generator G1 is supplying more load current than G2, the paralleling circuit 42 may operate to lower the output voltage of G1 thereby reducing its share of the load.

The paralleling circuit 42, as well as other control functions that may be carried out by the control circuit 40, can monitor the armature current for each generator G1, G2 (armature current being related to various factors such as load, generator speed, temperature and so on) by detecting the voltage drop across an interpole winding 44, 46 respectively. The generator interpole voltages can conveniently be converted to digital form using a respective A/D converter 48, 50 of conventional design. As shown in FIG. 1, the digitized interpole voltages are used by the paralleling circuit 42 as well as the gate drive PWM circuits 52, 54. The PWM circuits 52, 54 control the pulse width duty cycle of the field control switches 24, 16 respectively in response to the desired control function or algorithm which typically will be application specific.

Regulation of the generator voltages at the POR1 and POR2 nodes can be realized in the control circuit 40 by any of the conventional and well known regulator designs and/or control algorithms. The voltage regulation function can conveniently be included with the PWM control circuits 52, 54 (for clarity, the feedback connections between the POR1 and POR2 nodes to the PWM circuits are omitted) used to control the duty cycle of the field transistor drive signals, thus controlling the respective generators' field excitation current and the armature output voltage.

Those skilled in the art will appreciate that a generator's output voltage is a function of generator speed, e.g. that at a fixed field current, the generator voltage will increase with speed. Similarly, at a constant speed, the generator output voltage will vary with field current, e.g. at a constant speed, 2.5 amps field current will generate less output voltage than 5 amps of field current. It should also be noted that at voltage levels below that where the voltage regulator becomes active, field current varies with generator voltage and duty cycle. For example, if a generator has a two ohm field, a 50% duty cycle and 20 volts of output, the field current would be about 5 amps. If the duty cycle was 25% the field current would be about 2.5 amps. A generator needs to have a higher speed (RPM) to provide 20 volts of output at 2.5 amps field current that at 5 amps of field current.

In accordance with the teachings of the invention, the apparatus 10 is configured so as to provide a field drive current limiting function 60. In the described embodiment, this function operates to limit the duty cycle of the PWM drive signal 20 to the field switching device 18. This is represented by the use of an AND operation 62. Although represented in the drawing as a discrete circuit, those skilled in the art will readily appreciate that the field drive limiting function can be accomplished in many different ways, both in hardware and/or in software. Further, the particular profile of the field drive limiting function can be adjusted for each specific application. Depending on a particular application, the field drive limiting function could simply be a fixed limit on the duty cycle, or the field drive limit could be determined by an algorithm or other inputs based on the generator operation, to name just a few examples.

Figure 2:
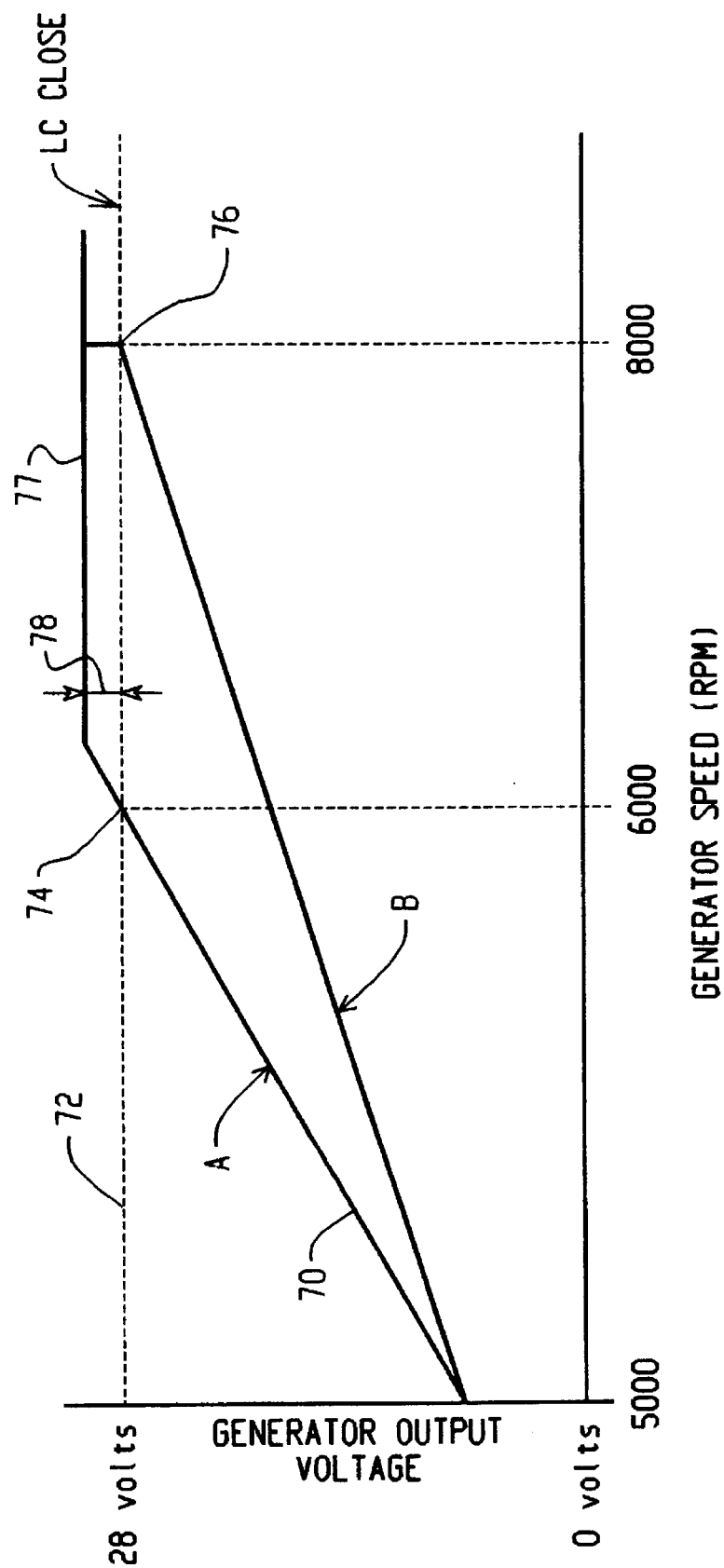
FIG. 2 is representative graph of a generator output voltage (or field drive current) versus time showing some of the concepts of the invention.

In the described embodiment herein, the limit function 60 is such as to limit the PWM duty cycle to something less than 100% during generator build-up. For example, during build-up the PWM duty cycle could be limited to 50%. The effect of such an operation will be understood from FIG. 2. FIG. 2 illustrates in a representative manner two graphs of a generator output voltage (armature voltage in the described embodiment) versus generator speed. The graph is intentionally drawn in an idealized manner for clarity and ease of understanding. Note that the plot begins at a generator speed of about 5000 rpm, such as may be a typical speed at starter cutoff (for applications where the generator is used as an engine starter, for example).

As indicated in graph A for an arrangement that does not use the field drive limiting feature of the invention, the generator output voltage builds during spin-up over a period 70 until the generator voltage reaches the threshold 72 at which point the line contactor is closed to connect the generator to the load e.g. bus voltage 77 (such as LC1 or LC2 in FIG. 1). This may occur, for example, at 6000 rpm. However, this line contactor closure operation is basically determined by the open circuit output voltage of the generator. When the generator is connected to the load, its speed may not be fast enough to assure proper voltage regulation, and also may not be fast enough to assure that the generator can accommodate its share of the load. In a multiple generator system such as that shown in FIG. 1, if the second generator connected to the load (in this example generator G2) is at too slow a speed, the paralleling function may cause a drop in the output voltage of G1 (in an attempt to load balance the two generators). Also, if the second generator is running too slow, it may experience undesirable reverse currents after it is connected to the load, which reverse currents could produce a contactor trip to disconnect the generator from the bus.

To alleviate these problems, particularly in systems that do not use a field weakening function, the PWM limit feature of the invention can be implemented. By limiting the field current during generator build-up, the output voltage of the generator builds up at a slower rate, as shown by graph B. This in effect causes the generator output voltage to reach the line contactor close threshold 72 at a higher generator speed, in this example shown at about 8000 rpm. The field current limit selected will be application specific and can be selected so that the second generator connected to a bus reaches the line contactor close voltage at a speed that is adequate for voltage regulation and load sharing.

Note that in the example of FIG. 1, there is provided a PWM limit function for each generator G1 and G2, if so desired, particularly if it is not predictable ahead of time which generator will reach rated speed first.

A significant aspect of the invention is that the speed at which a generator is connected to an energized bus can be determined and/or accurately approximated without the need for a generator speed sensor, and further without the need for modification of an existing line contactor closure circuit or paralleling function or PWM regulator function. Those skilled in the art will readily appreciate that the invention is also not limited to systems that regulate generator operation using PWM field drive operations.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Method for controlling connection of a generator to an energized bus independent of the use of a direct generator speed sense function, comprising the steps of:
   a. detecting a voltage differential between the generator voltage and the bus voltage;
   b. connecting the generator to the bus when the detected voltage differential reduces to a selected threshold; and
   c. limiting generator field current during generator build-up prior to connecting the generator to the bus to delay the voltage differential reducing to said threshold so that the generator attains a desired speed before being connected to the bus.

2. The method of claim 1 further comprising the step of using a PWM signal to control the generator field current.

3. The method of claim 2 wherein the PWM duty cycle is maintained at a selected value less than 100% during generator build-up.

4. The method of claim 3 wherein the generator is connected to the bus when the generator voltage approximately equals or is greater than the bus voltage.

5. The method of claim 4 wherein the selected PWM value controls generator voltage build-up so that the generator can be connected to the bus when the generator reaches a speed adequate for normal voltage regulation.

6. The method of claim 1 wherein said desired generator speed is predeterminably based on a generator speed for normal regulation of the generator voltage.

7. The method of claim 1 wherein said desired generator speed is predeterminably based on a generator speed adequate for the generator to operate at the expected load when connected to the bus.

8. The method of claim 1 further comprising the step of performing load sharing or paralleling of at least two generators connected to the bus.

9. Apparatus for controlling connection of a generator to an energized bus, comprising: means for determining voltage differential between the generator voltage and the bus voltage; means for connecting the generator to the bus when said voltage differential reaches a predetermined threshold; and means for limiting the generator field current during build-up prior to connecting the generator to the bus so that the generator reaches a predetermined speed before the generator is connected to the bus.

10. The apparatus of claim 9 wherein the bus is energized by a second generator.

11. The apparatus of claim 10 wherein said selected speed is adequate for the first generator to meet the expected bus load after connection.

12. The apparatus of claim 11 further comprising means for paralleling control of the two generators.

13. The apparatus of claim 9 wherein the generator is connected to the bus after reaching a speed such that reverse current into the generator is substantially prevented.

14. The apparatus of claim 9 wherein said connecting means comprises a line contactor that is activated when the generator voltage reaches said threshold.

15. The apparatus of claim 14 wherein said limiting means comprises a field transistor and produces a pulse width modulated (PWM) drive signal to said transistor, said PWM signal being limited to a value less than 100% during generator build-up during said time period.

16. The apparatus of claim 9 wherein the generator is connected to the bus independent of the use of a generator speed signal.

17. The apparatus of claim 9 in combination with a starter/generator on an aircraft engine.

* * * * *

UNITED STATES PATENT AND TRADEMARK OFFICE
CERTIFICATE OF CORRECTION

PATENT NO : 5,663,632
DATED : September 2, 1997
INVENTOR(S) : Roseman et al.

It is certified that error appears in the above-identified patent and that said Letters Patent is hereby corrected as shown below:

Column 4, line 14, "ranger" should be "range".

Signed and Sealed this

Ninth Day of December, 1997

Attest:

BRUCE LEHMAN

*Attesting Officer*      Commissioner of Patents and Trademarks